(12) United States Patent
Pfutzner et al.

(10) Patent No.: US 11,163,089 B2
(45) Date of Patent: Nov. 2, 2021

(54) NEUTRON IMAGING DEVICES FOR CASED WELLS AND OPEN BOREHOLES

(71) Applicant: SCHLUMBERGER TECHNOLOGY CORPORATION, Sugar Land, TX (US)

(72) Inventors: Harold Pfutzner, Richmond, TX (US); Mohammed Badri, Al-Khobar (SA); Mustapha Abbad, Al-Khobar (SA)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 93 days.

(21) Appl. No.: 16/522,877

(22) Filed: Jul. 26, 2019

(65) Prior Publication Data

US 2021/0026034 A1 Jan. 28, 2021

(51) Int. Cl.
| | |
|---|---|
| *G01N 23/22* | (2018.01) |
| *G01V 5/10* | (2006.01) |
| *E21B 49/00* | (2006.01) |
| *G01N 23/02* | (2006.01) |
| *G01N 23/223* | (2006.01) |
| *G01V 5/08* | (2006.01) |
| *G01V 5/04* | (2006.01) |

(52) U.S. Cl.
CPC .............. *G01V 5/101* (2013.01); *E21B 49/00* (2013.01); *G01N 23/025* (2013.01); *G01N 23/22* (2013.01); *G01N 23/223* (2013.01); *G01V 5/04* (2013.01); *G01V 5/08* (2013.01); *G01V 5/10* (2013.01)

(58) Field of Classification Search
CPC . G01N 23/22; G01V 5/04; G01V 5/08; G01V 5/10; G01V 5/101; G01V 5/102

USPC ............................................ 250/269.6, 269.7
See application file for complete search history.

(56) References Cited

U.S. PATENT DOCUMENTS

| | | | | |
|---|---|---|---|---|
| 4,093,854 A | * | 6/1978 | Turcotte ................. | G01V 5/102 250/269.2 |
| 5,023,449 A | * | 6/1991 | Holenka ................... | G01T 1/40 250/252.1 |
| 5,025,144 A | * | 6/1991 | Odom ..................... | H01J 29/023 250/207 |
| 5,076,993 A | * | 12/1991 | Sawa ..................... | G01V 5/0069 376/159 |
| 5,083,124 A | * | 1/1992 | Nordstrom ............ | E21B 47/017 340/853.1 |

(Continued)

*Primary Examiner* — Allen C. Ho
(74) *Attorney, Agent, or Firm* — Trevor G. Grove

(57) ABSTRACT

A neutron imaging device employs a neutron source including a sealed enclosure, gamma ray detector(s) spaced from the neutron source, and particle detector(s) disposed in the sealed enclosure of the neutron source. The output of the particle detector(s) can be used to obtain a direction of particles generated by the neutron source and corresponding directions of neutrons generated by the neutron source. Such information can be processed to determine locations in the surrounding borehole environment where the secondary gamma rays are generated and determine data representing formation density at such locations. In one aspect, the gamma ray detector(s) of the neutron imaging device can include at least one scintillation crystal with shielding disposed proximate opposite ends of the scintillation crystal. In another aspect, the particle detector(s) of the neutron imaging device can include a resistive anode encoder having a ceramic substrate and resistive glaze.

25 Claims, 7 Drawing Sheets

(56) References Cited

U.S. PATENT DOCUMENTS

| | | | | |
|---|---|---|---|---|
| 5,144,126 A * | 9/1992 | Perry | ............... | E21B 47/017 250/254 |
| 5,180,917 A * | 1/1993 | Wraight | ............... | G01T 1/185 250/252.1 |
| 5,241,569 A * | 8/1993 | Fleming | ............... | G01N 23/222 376/157 |
| 5,278,758 A * | 1/1994 | Perry | ............... | E21B 47/017 702/8 |
| 5,343,041 A * | 8/1994 | Ruscev | ............... | G01V 5/101 250/269.6 |
| 5,369,578 A * | 11/1994 | Roscoe | ............... | G01V 5/06 702/8 |
| 5,393,981 A * | 2/1995 | Szabo | ............... | G01T 3/06 250/367 |
| 5,481,114 A * | 1/1996 | Daniel | ............... | G01T 1/362 250/390.11 |
| 5,483,062 A * | 1/1996 | Czirr | ............... | G01T 1/202 250/256 |
| 5,539,225 A * | 7/1996 | Loomis | ............... | G01V 5/101 250/269.4 |
| 5,635,712 A * | 6/1997 | Scott, III | ............... | E21B 49/006 250/260 |
| 5,825,024 A * | 10/1998 | Badruzzaman | ............... | G01V 5/125 250/269.6 |
| 6,144,032 A * | 11/2000 | Gazdzinski | ............... | G01N 23/222 250/269.6 |
| 6,766,855 B2 * | 7/2004 | Snoga | ............... | E21B 47/026 166/254.1 |
| 7,073,378 B2 * | 7/2006 | Smits | ............... | G01V 5/12 73/152.14 |
| 7,117,092 B2 * | 10/2006 | Jacobson | ............... | G01V 5/101 702/8 |
| 7,151,254 B2 * | 12/2006 | Mickael | ............... | G01V 5/08 250/269.3 |
| 7,233,007 B2 * | 6/2007 | Downing | ............... | G01T 3/008 250/390.11 |
| 7,420,175 B2 * | 9/2008 | Chu | ............... | G01V 5/0069 250/358.1 |
| 8,269,162 B2 * | 9/2012 | Kirkwood | ............... | G01V 5/125 250/269.6 |
| 8,338,777 B2 * | 12/2012 | Nikitin | ............... | G01V 5/101 250/269.6 |
| 8,373,129 B2 * | 2/2013 | Kotlick | ............... | G01T 1/00 250/358.1 |
| 8,440,960 B2 * | 5/2013 | Oraby | ............... | G01V 5/104 250/269.6 |
| 8,461,520 B2 * | 6/2013 | Roberts | ............... | G01V 5/101 250/269.6 |
| 8,492,723 B2 * | 7/2013 | Groiselle | ............... | G01N 23/222 250/358.1 |
| 8,692,185 B2 * | 4/2014 | Guo | ............... | G01V 5/101 250/269.4 |
| 8,785,864 B2 * | 7/2014 | Ricci | ............... | H01L 31/0203 250/367 |
| 8,907,269 B2 * | 12/2014 | Chalitsios | ............... | H05H 3/06 250/269.4 |
| 8,907,270 B2 * | 12/2014 | Beekman | ............... | G01V 5/101 250/269.6 |
| 8,921,801 B2 * | 12/2014 | Dioszegi | ............... | G01T 1/2985 250/394 |
| 8,964,504 B2 * | 2/2015 | Chace | ............... | G01V 5/101 367/35 |
| 9,012,836 B2 * | 4/2015 | Wilson | ............... | G01V 5/101 250/254 |
| 9,057,794 B2 * | 6/2015 | Xu | ............... | G01V 5/101 |
| 9,123,519 B2 * | 9/2015 | Bendahan | ............... | G01V 5/0069 |
| 9,310,491 B2 * | 4/2016 | Stephenson | ............... | G01T 1/20 |
| 9,335,436 B2 * | 5/2016 | Korjik | ............... | G01T 3/06 |
| 9,575,206 B2 * | 2/2017 | Guo | ............... | G01V 5/101 |
| 9,835,757 B2 * | 12/2017 | Guo | ............... | G01V 5/101 |
| 10,036,828 B2 * | 7/2018 | Jain | ............... | G01V 5/101 |
| 10,114,143 B2 * | 10/2018 | Manclossi | ............... | E21B 47/10 |
| 10,209,392 B2 * | 2/2019 | Vasguez | ............... | G01V 5/101 |
| 10,215,882 B2 * | 2/2019 | Lehman | ............... | C09K 8/68 |
| 10,247,849 B2 * | 4/2019 | Pfutzner | ............... | G01V 5/102 |
| 10,473,813 B2 * | 11/2019 | Zhou | ............... | G01V 5/045 |
| 10,564,311 B2 * | 2/2020 | Stoller | ............... | G01V 5/101 |
| 10,955,582 B2 * | 3/2021 | Jurczyk | ............... | G01V 5/10 |
| 11,014,854 B2 * | 5/2021 | Preston | ............... | C04B 35/547 |

\* cited by examiner

NEUTRON IMAGING DEVICES FOR CASED WELLS AND OPEN BOREHOLES

FIELD

The present disclosure relates to devices, methods, and systems that produce images or maps of physical measurements of formation rock of open boreholes or cased wells as a function of measured depth and azimuth.

BACKGROUND

Borehole imaging devices are high resolution logging tools that produce images or maps of physical measurements of the rocks exposed on a borehole wall as a function of measured depth and azimuth. Borehole imaging devices employ two main techniques: ultrasonic reflection scanning and electrical scanning. The ultrasonic reflection scanning technique employs a rotating ultrasonic transducer that emits a pulse and receives the signal reflected by the borehole wall. The ultrasonic transducers can be either focused or unfocused and have frequencies in the range of 200 kHz to 1 MHz. Orientation of the ultrasonic transducer is normally measured by a magnetometer. Two types of images can be obtained: one based on the reflected amplitude and one on the two-way travel time. By convention, darker gray tones are used for lower reflected amplitudes and higher two-way travel times. The ultrasonic reflection scanning technique provides a borehole wall surface measurement and as such is affected by rugosity, drill marks, borehole ellipticity, and tool eccentricity. The electrical scanning technique is an extension of the dipmeter technique. In this method, an array of closely spaced electrodes is mounted on a conductive pad and pressed against the borehole wall. The amount of current emitted from each electrode is recorded as a function of azimuth and depth. The electrical scanning technique thus produces a map or image of micro-resistivity of the borehole wall as a function of measured depth and azimuth. The micro-resistivity image can cover a partial azimuth range corresponding to the positions of sensing electrodes on the sonde, or it can cover the full azimuthal range. The full azimuthal image can be accomplished in several ways. If the device is part of a wireline sonde, then the array of sensing electrodes can cover the full circumference of the wireline sonde and thereby cover all azimuthal angles of the borehole wall. Alternatively, the array of sensing electrodes can be mounted on a rotating subassembly of the wireline sonde and will thereby contact the full azimuth of the borehole wall as the rotating subassembly rotates through a full 360°. On the other hand, if the device is part of a drilling bottom hole assembly, then the array of sensing electrodes can contact the full azimuth of the borehole wall as the bottom hole assembly is rotated during the drilling process.

Higher resolution visual images using a closed-circuit television camera are sometimes obtained in a borehole, however this is limited in usefulness to wells where the borehole fluid is transparent such as air boreholes or gas-filled boreholes. This is most often not the case, since boreholes typically have oil, dirty water, and drilling mud in them.

The use of visual images and resistance images is always limited to open hole conditions, as neither technique can penetrate the steel casing of a cased well. There are instances when it is useful to make measurements after a well has been cased. For time and cost savings, borehole measurements while the borehole is not cased are limited to those that bring the most value. Sometimes, no borehole measurements whatsoever are made before the well is cased. Later, unplanned circumstances may create a need for borehole measurements in a well where certain measurements including borehole images were not obtained while the well was uncased. In this case, an image using visual or resistance images can never be obtained except under the dire circumstances where the well casing is removed for remedial actions.

In addition to the obvious case of well casing preventing the acquisition of electrical resistance images or visual images, there are many examples of borehole effects induced during the drilling process that can alter an image such that the image is not representative of the deeper formation away from the borehole. Instead, the image is more representative of the drilling process and the formation's reaction to that process.

Furthermore, drilling mud greatly affects borehole images. If it is oil-based mud, then the oil from the mud may replace saline water in the pores of the formation and thereby reduce or eliminate the contrast in electrical resistance between matrix rock and pores, vugs and fractures. Also, drilling mud will typically form a thin layer on the borehole wall called mudcake, which makes all borehole features invisible to visual imaging or electrical resistance imaging.

In the case of borehole image while-drilling, the mechanical action of the drill bit and bottom hole assembly of the drill string can affect the borehole imaging. Various features can be artifacts of drilling such as the spiral groove called cork-screwing. Some fractures at the borehole wall may be created during the drilling process or pre-existing fractures in the formation may be enlarged or extended during drilling. Portions of the borehole wall may break off and fall into the borehole, leaving voids that appear as blank areas in an image produced with electrical resistance measurements.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the present disclosure include a neutron imaging device having a neutron source with a sealed enclosure. The neutron source generates neutrons and associated particles whereby the neutrons are emitted into a surrounding borehole environment. At least one gamma ray detector is spaced from the neutron source. The gamma ray detector(s) detects secondary gamma rays generated by interaction between the neutrons emitted into the surrounding borehole environment. At least one particle detector is disposed in the sealed enclosure of the neutron source. The particle detector(s) detects the associated particles generated by the neutron source. The output of the particle detector(s) can be processed to obtain the direction of particles generated by the neutron source based on output of the at least one particle detector. Such information can be processed to determine locations in the surrounding borehole environment where the secondary gamma rays are generated and determine data representing formation density at such locations. The formation density data can be output or displayed to provide an image or map of formation density as a function of measured depth and azimuth in the borehole environment.

In one aspect, the gamma ray detector(s) of the neutron imaging device can include at least one scintillation crystal with shielding disposed proximate opposite ends of the scintillation crystal.

In one aspect, the particle detector can include a resistive anode encoder having a ceramic substrate and resistive glaze.

Additional aspects, embodiments, and advantages of the disclosure may be understood with reference to the following detailed description taken in conjunction with the provided drawings.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice.

The present disclosure addresses the above-described need for improved borehole imaging. Aspects of the present disclosure provide a neutron imaging device that can provide an improved depth of investigation that does not rely on visual imaging or electrical resistance imaging. It can also be used to obtain an image in a cased well and/or to produce a medium to high resolution image that is less affected by near-borehole effects.

The neutron imaging device is effective in the borehole environment due to a number of factors. First, the neutrons can be emitted with sufficient energy to pass through a well casing or to pass through near borehole damage with little interaction, so that an image can be obtained of the formation behind the casing and/or behind the near borehole damage. Second, the neutron imaging device is suitable for operation in the borehole environment, which can include high temperatures, small borehole diameter, and a prevalence of mechanical shock and vibrational forces.

Figure 1A:
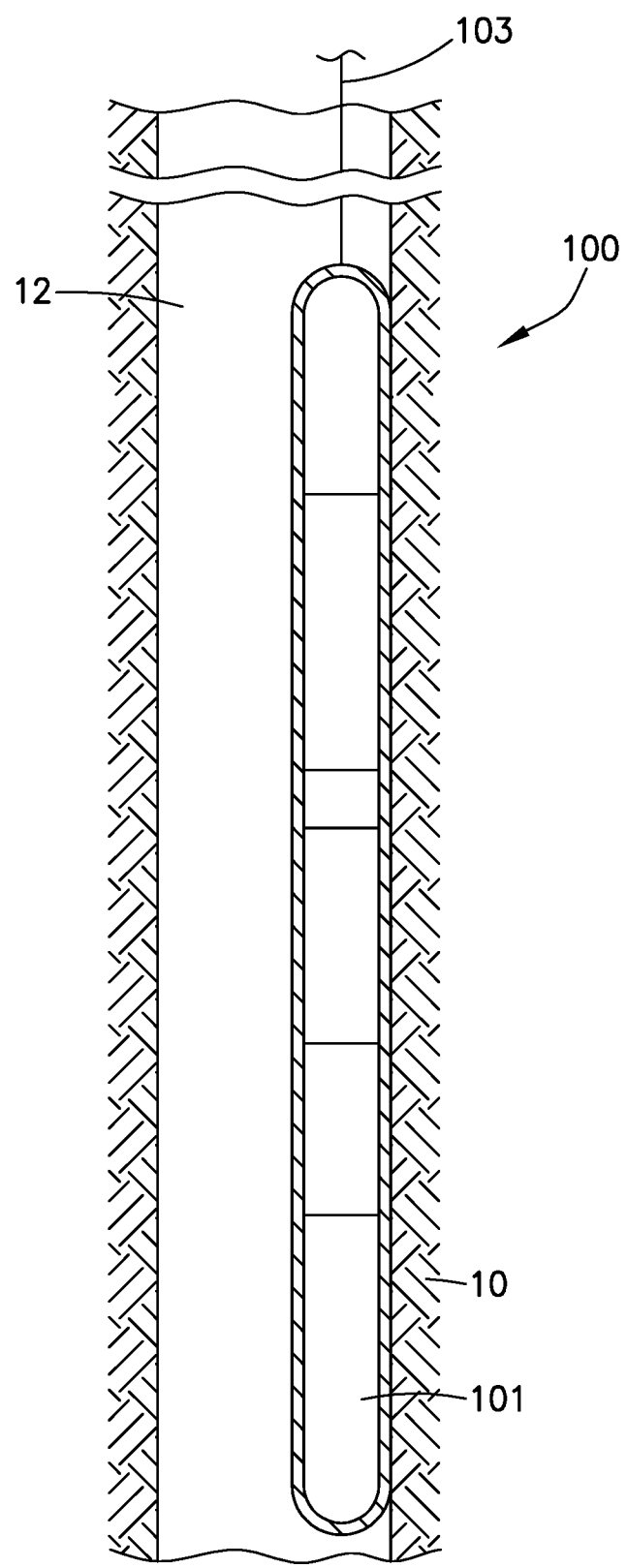
FIG. 1A is a schematic diagram depicting a wireline logging tool in which embodiments of the present disclosure can be used.
Figure 1B:
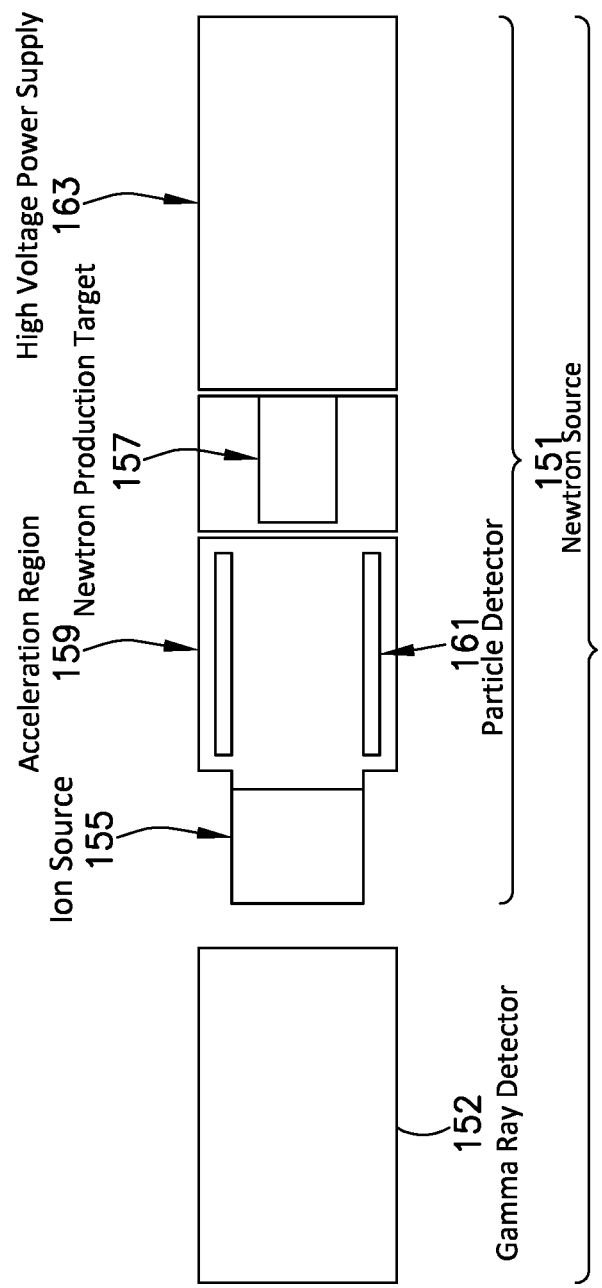
FIG. 1B is a schematic diagram of a neutron imaging device according to the present disclosure.
Figure 1C:
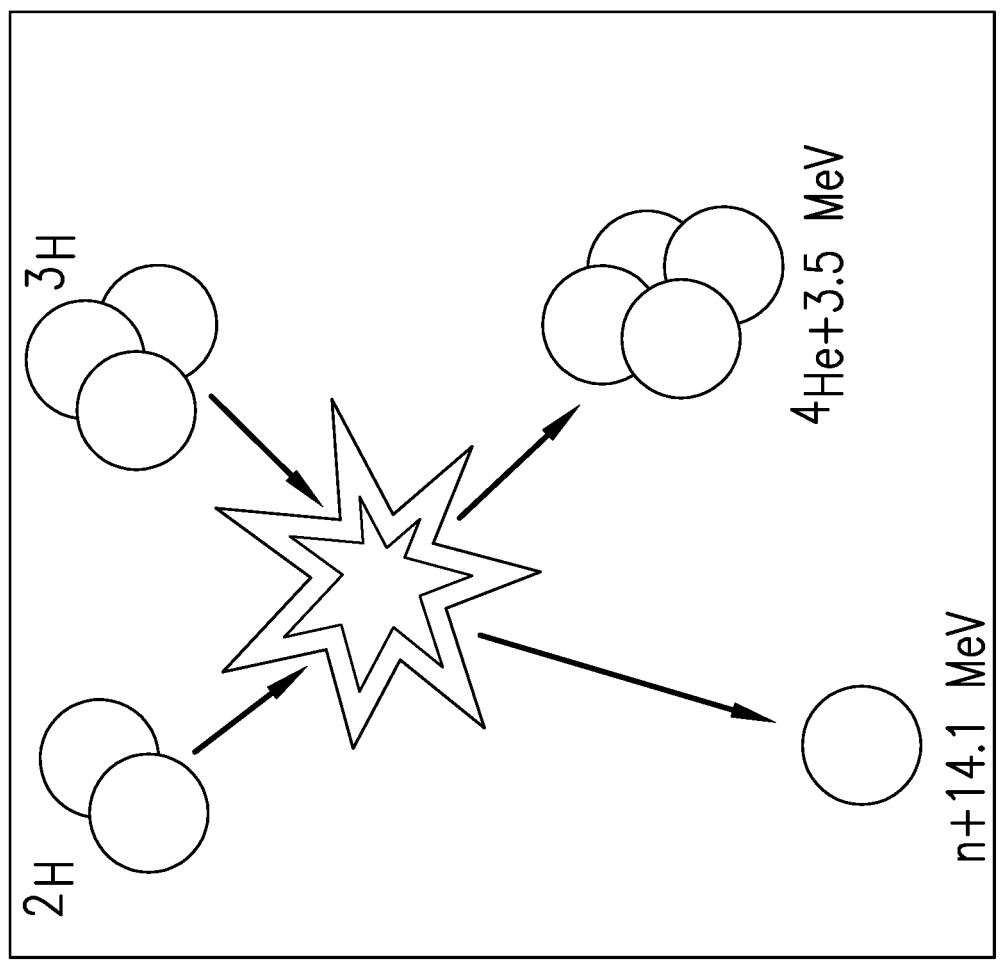
FIG. 1C is a schematic diagram of the deuterium-tritium (D-T) fusion reaction, which can be used by the neutron imaging device of FIG. 1B.

Turning now to FIGS. 1A through 1C, an exemplary neutron imaging device (apparatus or tool or sonde) 100 is shown for providing an image of a borehole 12 that traverses a geological formation 10. The neutron imaging device 100 comprises a housing 101 that is conveyed in the borehole 12 by a wireline 103 or other suitable conveyance means as shown in FIG. 1A. The housing 101 encloses a neutron source 151 and one or more gamma-ray detectors (one shown as 152) spaced from the neutron source 151 as shown in FIG. 1B. The neutron source 151 is configured to provide high energy neutrons. For example, the neutron source 151 may include an accelerator-based neutron source that makes use of the deuterium-tritium (D-T) fusion reaction which simultaneously emits a neutron and an alpha particle ($^4$He nucleus) or another heavy charged particle as shown in FIG. 1C. Note that the direction of travel of a single neutron can be determined if one can measure the direction of travel of the simultaneously-emitted alpha particle or another heavy charged particle. Conservation of momentum in the deuterium-tritium (D-T) fusion reaction requires that the neutron always travel in the opposite direction from the alpha particle or other heavy charged particle.

The neutron source 151 includes an ion source 155, ion focusing electrodes (not shown) and a neutron production target 157 (which contains tritium) that are enclosed within a sealed enclosure (such as sealed tube). The ion source 155 produces deuterium ions that are focused and accelerated over an acceleration region 159 by an electric field applied by the focusing electrodes. Such focused high energy ions bombard the neutron production target 157 to produce neutrons and associated alpha particles ($^4$He nucleus) or other heavy charged particles via the deuterium-tritium (D-T) fusion reaction. Those of ordinary skill in the nuclear arts will appreciate that the alpha particle (or other heavy charged particle) and the neutron are produced simultaneously and emitted in opposite directions (they are therefore correlated in time and space). As a result, the direction of the alpha particle (or another heavy charged particle) specifies the trajectory of the neutron (and vice versa). The neutron source 151 further includes at least one particle detector 161 (CP-PSD) that is disposed about the neutron production target 157 proximate the acceleration region 159 within the sealed enclosure of the neutron source 151. The neutron source 151 further includes a high voltage power supply 163 that supplies high voltage power supply signals to the components of the neutron source 151 in order to produce the applied electric field that accelerates and focuses the deuterium ions onto the neutron production target 157. The neutron source 151 can employ insulation such as glass and/or ceramic insulators to provide electrical isolation between the components of the neutron source 151 as well as feed-thru connectors to carry the high voltage power supply signals and other electrical signals to the components within the sealed enclosure of the neutron source 151. The neutron imaging device 100 can further include a neutron shield (not shown) that is disposed between the neutron source 151 and the at least one gamma ray detector 152. The neutron imaging device 100 can also include a neutron detector (not shown), such as a conventional $^3$He neutron detector.

Figure 2:
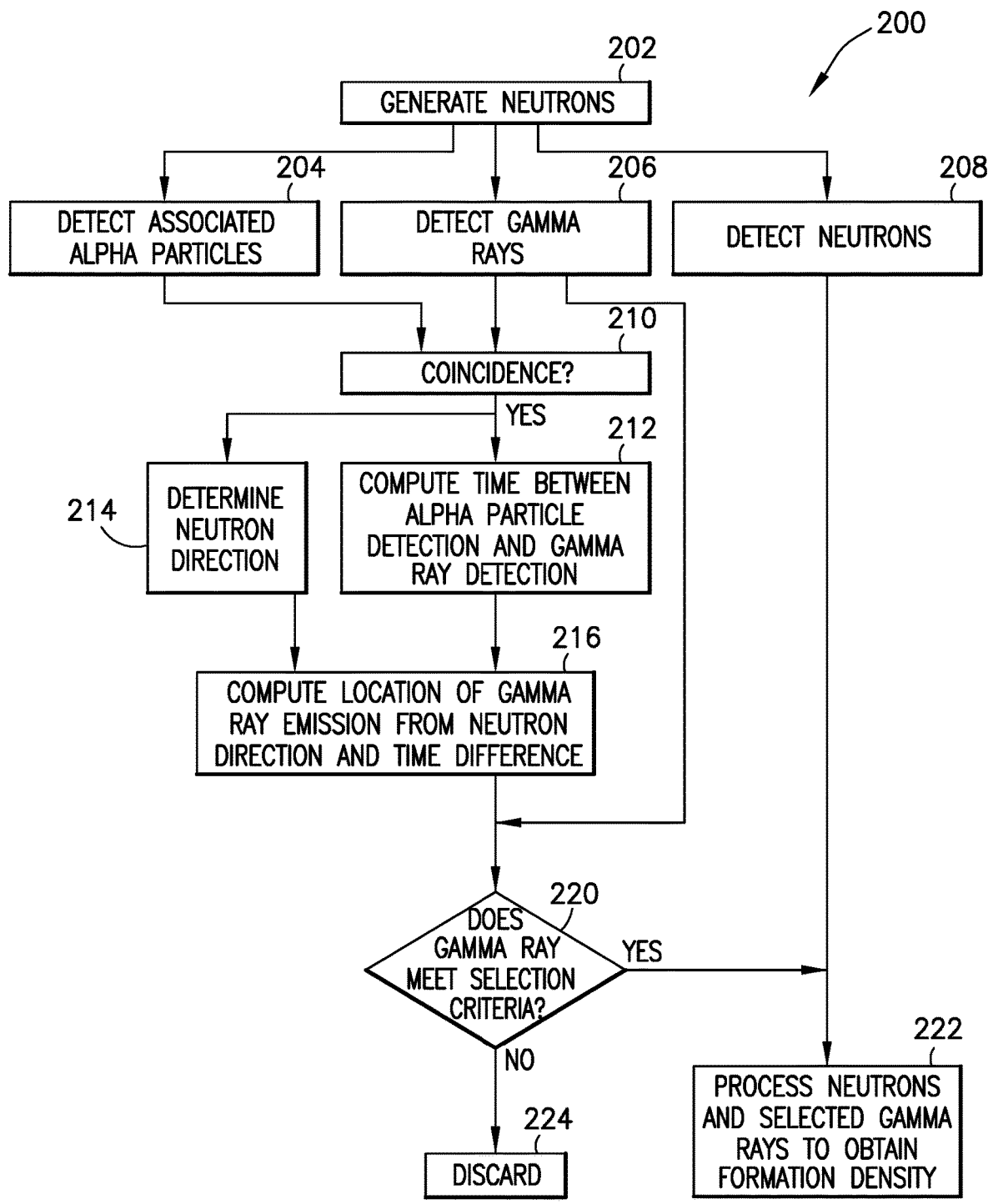
FIG. 2 is a flow chart of an embodiment which can be carried out by the neutron imaging device of FIG. 1B.

FIG. 2 depicts a flow chart of one method 200 carried out by the neutron imaging device 100 of FIGS. 1A-1C in accordance with the present disclosure. At 202, the neutron source 151 is configured to generate neutrons, for example, by making use of the deuterium-tritium (D-T) fusion reaction as described herein. The neutrons emerge from the neutron source 151 and interact with the borehole 12 (i.e., with the environment surrounding the borehole 12 including the tool, the borehole fluid and the rock formation) to produce secondary gamma rays as described above. At 204, alpha particles (or other heavy charged particles) are detected using the at least one particle detector 161. At 206, gamma rays are detected using the at least one gamma ray detector 152. At 208, neutrons may optionally be detected using at least one neutron detector.

At 210, the detected alpha particles (or other heavy charged particles) and the detected gamma rays are evaluated for coincidence. Those of ordinary skill in the art will readily recognize that by coincidence it is meant that a detected alpha particle (or other heavy charge particle) and a detected gamma ray are associated with one another (i.e., the detected alpha particle and the emitted neutron from which the detected gamma ray is generated are associated in time and space from the same nuclear event). Such coincidence may be determined, for example, via a time correlation (e.g., a gamma ray detected within 10 nanoseconds of a detected alpha particle may be said to be in coincidence with the detected alpha particle). Those of skill in the art will appreciate time correlation may be determined via software or hardware means. The selection criteria may include coincidence such that only gamma rays having coincidence with a corresponding alpha particle are selected. In the absence of coincidence, the detected gamma rays are discarded. When coincidence is obtained, a time difference between the detected alpha particle and the corresponding detected gamma ray is computed at 212. At 214, the detected alpha particles are further evaluated to determine a direction of neutron propagation. For example, the output of the at least one particle detector 161 can be used to determine the direction of particle propagation, which can be transformed to derive the opposite direction of the neutron propagation. At 216, an approximate location of the gamma ray emission can be determined from the time difference computed at 212 and the direction of neutron propagation determined at 214.

At 220, each of the detected gamma rays can be evaluated to determine whether it meets predetermined selection criteria. At 222, gamma rays that are determined to meet the selection criteria in 220 are processed in combination with the neutrons detected at 208 to determine a measure of formation density at the approximate location of the gamma ray emission determined at 216. At 224, gamma rays that are determined not to meet the selection criteria in 220 may be discarded. The operation of 222 is performed for multiple gamma rays that are determined to meet the selection criteria in 220 to produce a map or image of formation density (i.e., data representing formation density as a function of measured depth and azimuth) at locations that surround the borehole and to display or otherwise output the image or map of formation density.

Note that method 200 of FIG. 2 carried out by the neutron imaging device 100 of FIGS. 1A-1C employs the associated particle method where an alpha particle or other heavy charged particle is emitted at the same time as the neutron. There are several such neutron producing reactions, but this disclosure focuses on the well-known D-T fusion reaction which simultaneously emits a neutron and an alpha particle ($^4$He nucleus). In this case, the alpha particle is the so-called associated particle. The D-T reaction can be used in many applications because the neutron energy and neutron flux are high compared to other reactions. For these reasons also, there exists a large body of knowledge on this reaction, a long history of application of this reaction in well logging, and a wide array of reliable borehole qualified technology built around this reaction.

FIG. 1C illustrates the D-T fusion reaction. The incident particles are a deuteron and triton, the ionized nuclei of deuterium and tritium atoms. In typical devices using this reaction, one of the two particles is dissociated, ionized, and accelerated toward a target containing the other, which is stationary and neutral. Upon collision of these two particles and with sufficient kinetic energy to overcome the Coulomb barrier, the two nuclei fuse to form an alpha particle ($^4$He nucleus) and a free neutron. This reaction is denoted as $T(d,n)^4$He according to the convention Target(projectile, ejectile)Residual. The projectile acceleration energy is very low with a minimum value of 30 keV and a typical value of 100 keV. Because of the very large binding energy of the $^4$He nucleus, the kinetic energies of ejectile and residual are very high; 14.1 MeV and 3.5 MeV, respectively. It is this large binding energy of $^4$He that makes this reaction the choice for fusion reactors for electrical power and the reaction of choice for a neutron source for measurement purposes.

The large difference in energy between the kinetic energy of input particles, 100 keV, and the kinetic energy of output particles, 14.1 MeV plus 3.5 MeV, accounts for a useful property of this reaction. The neutron flux is isotropic, meaning neutrons travel in all directions with equal probability, because there is very little energy of the projectile to define a preferred direction. This same aspect of the reaction kinematics ensures that neutron and alpha particles travel in exactly opposite directions, which is a useful property of this reaction as applied to the associated particle method. The premise of the associated particle method is that the direction of travel of a single neutron can be determined if one can measure the direction of travel of the alpha particle; the neutron will have travelled in the opposite direction from the alpha particle.

Several factors make this method promising in the oil and gas borehole environment. The first factor is that neutrons are sufficiently penetrating to pass through a well casing or to pass through near borehole damage with little interaction, so that an image can be obtained of the formation behind the casing and/or behind the near borehole damage.

A second factor relates to the maturity of nuclear technology suitable for borehole conditions. The important requirements for nuclear technology to operate in a borehole are high temperature, small borehole diameter, and ruggedness. Due to the evolution of relevant technology and the current state of such technology, all of these requirements can be met with the associated particle method for neutron imaging.

Figure 3A:
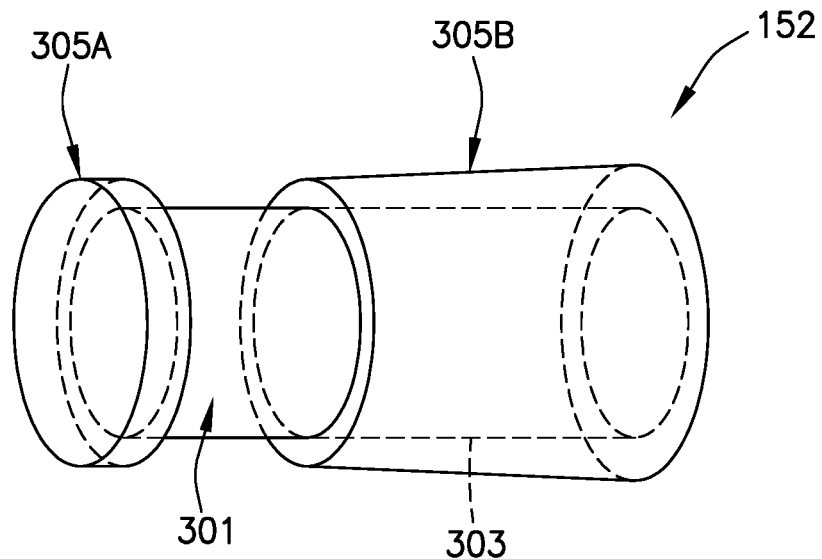
FIG. 3A is a schematic diagram of a first embodiment of gamma ray detector functionality that can be part of the neutron imaging device of FIG. 1B.

In an embodiment shown in FIG. 3A, the gamma ray detector(s) 152 of the neutron imaging device 100 includes a cylindrical scintillation crystal 301 and corresponding photomultiplier tube 303 and associated shielding. For example, the shielding can include a front shield 305A disposed proximate one end of the cylindrical scintillation crystal 301, and back shield 305B disposed proximate the other end of the cylindrical scintillation crystal 301 and surrounding the photomultiplier tube 303. The cylindrical scintillation crystal 301 can require large mass and large size in order to have sufficient detection efficiency and thus can be 1-inch in diameter or more. The length of the cylindrical scintillation crystal 301 can vary substantially, but it is expected that a 1-inch length can retain detection efficiency in an imaging application. The cylindrical scintillation crystal 301 is configured to generate photons (light) in response to incident gamma rays over the full 360-degree range of azimuthal angles of the tool. The photomultiplier tube 303 is operably coupled to the cylindrical scintillation crystal 301 and converts the photons (light) emitted by the cylindrical scintillation crystal 301 into photoelectrons and multiplies the photoelectrons for conversion into a useful electrical signal. The size, shape and location of the front shield 305A and the back shield 305B can be configured to limit the trajectories of incoming gamma rays as desired. For example, the size, shape and location of the front shield 305A and the back shield 305B can be configured to not limit the azimuthal angle of the incoming gamma rays incident on the cylindrical scintillation crystal 301 In this embodiment, azimuthal information of the incoming gamma rays is obtained only from the output of the at least one particle detector 161 and the direction of propagation of the alpha particle derived therefrom.

Figure 3B:
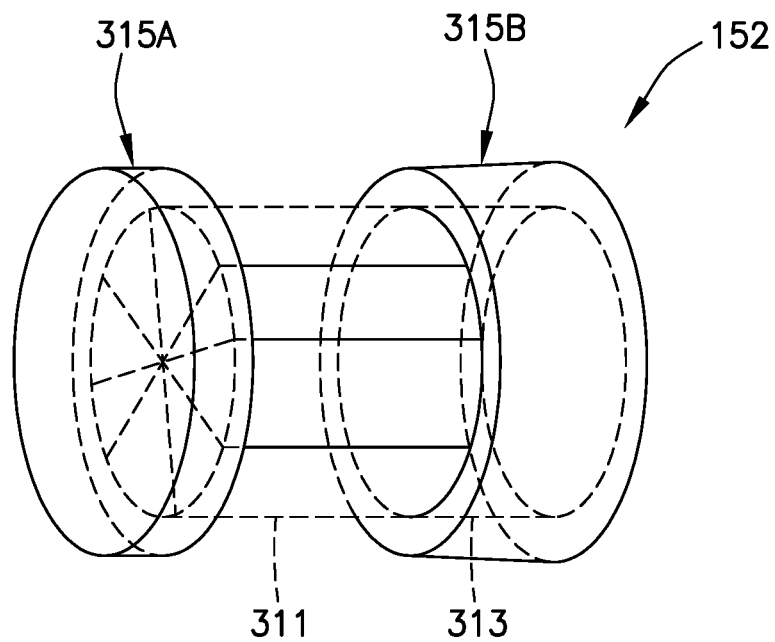
FIG. 3B is a schematic diagram of a second embodiment of a gamma ray detector functionality that can be part of the neutron imaging device of FIG. 1B.

In another embodiment shown in FIG. 3B, the gamma ray detector(s) 152 of the neutron imaging device 100 can include a segmented scintillation crystal 311 with a corresponding photomultiplier tube 313 and associated shielding. For example, the shielding can include a front shield 315A disposed proximate one end of the segmented scintillation crystal 311, and back shield 315B disposed proximate the other end of the segmented scintillation crystal 311 and surrounding the photomultiplier tube 313. The segmented scintillation crystal 311 includes a number of elongate segments each with a cross-sectional shape of a slice of a pie. The elongate segments of the segmented scintillation crystal 311 are configured to generate photons (light) in response to incident gamma rays over different azimuthal directions (i.e., different predefined range of azimuthal angles of the neutron imaging device 100). The photomultiplier tube 313 is operably coupled to the segments of the segmented scintillation crystal 311 and converts the photons (light) emitted by the segments of the segmented scintillation crystal 311 into photoelectrons and multiplies the photoelectrons for conversion into a useful electrical signal.

In embodiments, the photomultiplier tube 313 can be realized by a position sensitive photomultiplier, such as a micro-channel plate detector or other suitable position sensitive photomultiplier device. The micro-channel plate detector is a planar component used for detection of the secondary gamma ray radiation. It is closely related to an electron multiplier, as both intensify single particles or photons by the multiplication of electrons via secondary emission. However, because a microchannel plate detector has many separate channels, it can additionally provide spatial resolution (and thus azimuthal information) of the detected secondary gamma ray radiation. Typically, the micro-channel plate detector is formed from a thin slab of highly resistive material (for example, 2 mm in thickness) with a regular array of tiny tubes or slots (microchannels) leading from one face to the opposite, densely distributed over the whole surface. The microchannels are typically approximately 6-10 micrometers in diameter and spaced apart by approximately 15 micrometers. The microchannel plate functions as a photon amplifier, turning a single impinging photon generated by the segmented scintillation crystal 311 into a cloud of electrons. By applying a strong electric field across the micro-channel plate, each individual microchannel becomes a continuous-dynode electron multiplier. A photon that enters one of the channels impacts the wall of the channel and such impact starts a cascade of electrons that propagates through the channel, amplifying the original signal by several orders of magnitude depending on the electric field strength and the geometry of the micro-channel plate. The electrons exit the channels on the opposite side of the plate where they are collected on an anode. The anode can be designed to allow a spatially resolved collection, producing a location (azimuthal information) of the secondary gamma ray radiation incident on the segmented scintillation crystal.

The size, shape and location of the front shield 315A and the back shield 315B can be configured to limit the trajectories of incoming gamma rays as desired. For example, the site, shape and location of the front shield 315A and the back shield 315B can be configured not to the azimuthal angle of the incoming gamma rays incident on the segmented scintillation crystal 311, The embodiment of FIG. 3B can be suitable for use in a larger diameter logging tool where the individual elongate segments of the segmented scintillation crystal 311 are still large enough to meet detection efficiency requirements.

Figure 3C:
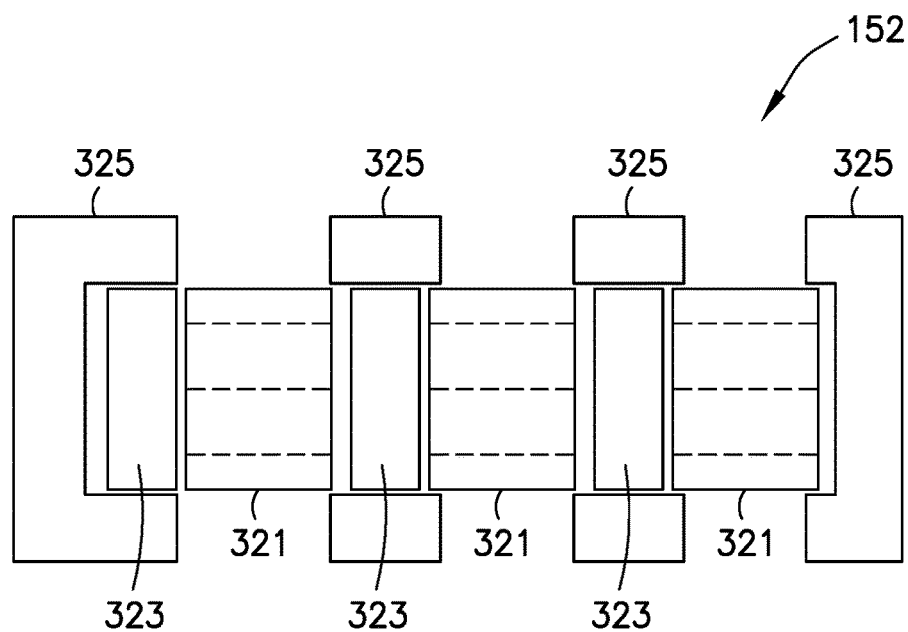
FIG. 3C is a schematic diagram of a third embodiment of gamma ray detector functionality that can be part of the neutron imaging device of FIG. 1B.

In another embodiment shown in FIG. 3C, the gamma ray detector(s) 152 of the neutron imaging device 100 can include three segmented scintillation crystals 321 with three corresponding photomultiplier tubes 323 and associated shielding 325 assembled along the central axis of the neutron imaging device 100 and configured to detect gamma rays from alternate trajectories that will contribute to the image. The three segmented scintillation crystals 321, photomultiplier tubes 323 and associated shielding 325 are similar to the segmented scintillation crystal 311, the three photomultiplier tube 313 and the front shield 315A and the back shield 315B of the embodiment of FIG. 3B and described above.

In embodiments, the neutron source 151 of the neutron imaging device 100 can employ a high voltage connection configuration at the target end of the neutron source 151 proximate the neutron production target 157. The high voltage connection configuration accommodates the placement of the particle detector(s) 161 within the sealed envelope of the neutron source 151 and makes it possible to transfer voltage signals produced by the particle detector(s) 161 during the detection of charged particles through the hermetic envelope of the neutron source 151 and to electronic circuitry that operates around ground potential.

Figure 4:
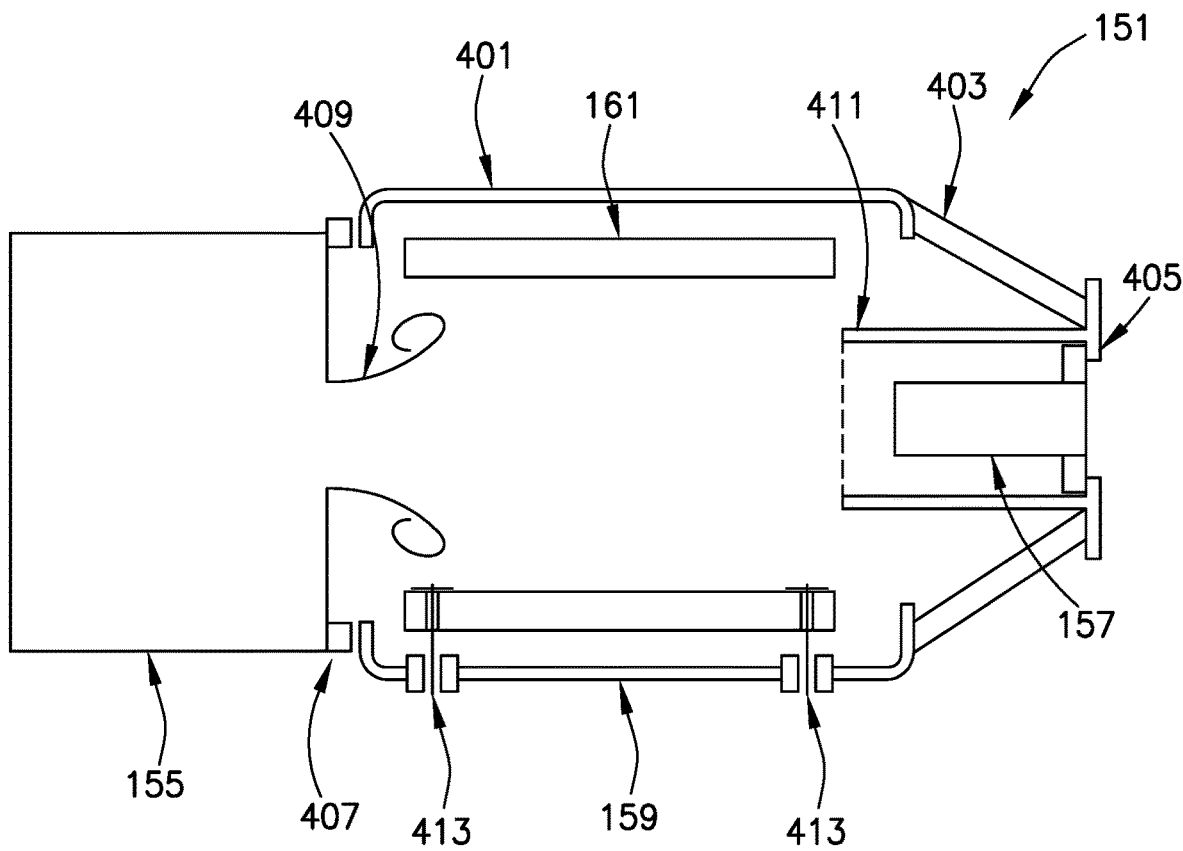
FIG. 4 is a schematic diagram of a sealed-tube neutron source that can be part of the neutron imaging device of FIG. 1B.

An example of such a high voltage connection configuration is shown in FIG. 4. The neutron source 151 includes a cylindrical section 401 made of steel or other conductive metal and is connected to ground potential. The cylindrical section 401 surrounds the acceleration region 159 where ions from the ion source 155 accelerate toward the neutron production target 157. The cylindrical section 401 together with a frustoconical high-voltage insulator section 403 and ring-shaped low-voltage insulator section 405 provides part of the hermetic envelope of the sealed neutron source 151. At the end of the cylindrical section 401 opposite the neutron production target 157 (i.e., the left end in FIG. 4) is a small insulating ring 407 that provides electrical insulation between the grounded cylindrical section 401 and an extraction electrode 409 of the ion source 155. At the other end of the cylindrical section 401 proximate the neutron production target 157 (i.e., the right end in FIG. 4) is the frustoconical high voltage insulator section 403 that electrically insulates the grounded cylindrical section 401 from the very high voltage (in a non-limiting example about 80 to 300 kV) of the secondary electron suppression electrode (suppressor) 411. The high voltage power supply (not shown) is connected to this suppressor electrode 411. The ring-shaped low-voltage insulator section 405 is disposed between the suppressor electrode 411 and the neutron production target 157 through a voltage divider resistor (not shown) that keeps the suppressor electrode 411 at a somewhat lower negative voltage than the neutron production target 157; this small voltage difference between suppressor electrode 411 and the neutron production target 157 prevents the emission of low energy secondary electrons from the neutron production target 157.

Note that the cylindrical section 401 at ground potential creates an electric field within the sealed tube neutron source 151 and around the acceleration section 159 that is close to ground potential. The potential of the acceleration section 159 around ground potential permits the placement and operation of the particle detector(s) 161 within this cylindrical section 401. Specifically, the particle detector(s) 161 can perform its function of detecting the recoil alpha particles and transmitting low voltage detection signals outside of the hermetic sealed tube neutron source 151 when it is at or near ground potential. Such low voltage detection signals are carried by electrical feed-throughs (for example, two feed-throughs shown as 413) that extend through the hermetic sealed tube neutron source 151 to electronic circuitry (not shown) that processes the low voltage detection signals.

Figure 5:
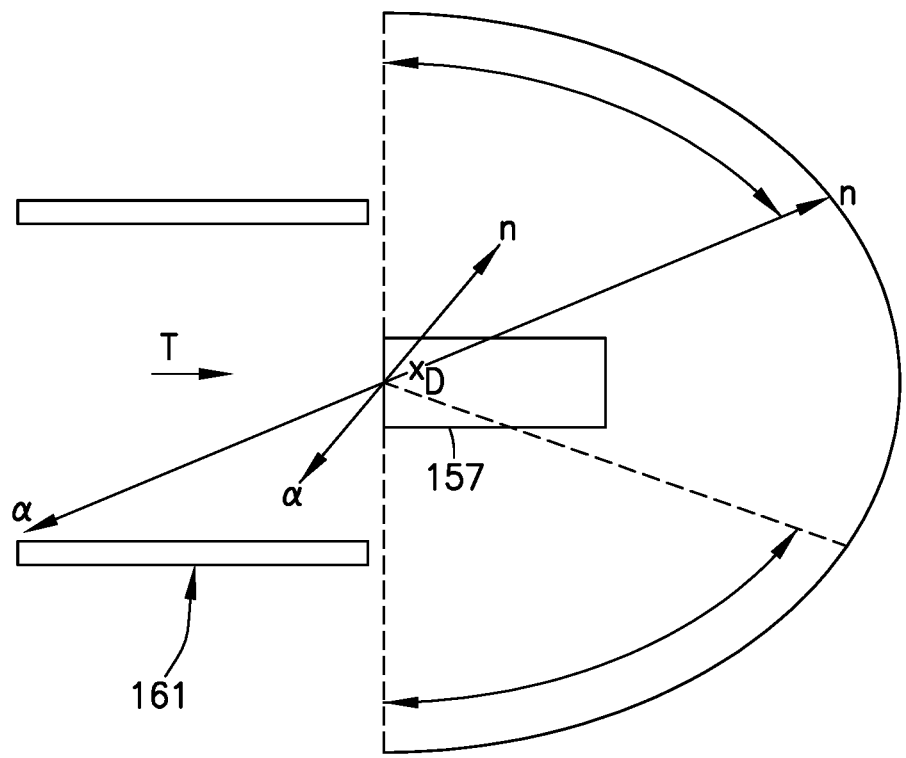
FIG. 5 is a schematic illustration of the spatial profile of neutrons and associated particles emitted from the target of the sealed-tube neutron source of FIG. 4.

In addition to being at ground potential, the cylindrical section 401 at ground potential is also conveniently at the best location for intercepting most of the recoil alpha particles that leave the neutron production target 157. FIG. 5 shows the circular area where alpha particles travel but are not detected by the particle detector(s) 161. Specifically, the alpha particles are only detectable within a hemisphere, because half of the alpha particles have a trajectory into the neutron generator target and because of the very small depth of penetration of alpha particles that never emerge from the neutron production target 157. It is therefore not necessary for the particle detector(s) 161 to extend beyond the longitudinal position where the neutron production target 157 begins. Also, consequently, even though neutrons are emitted from the target isotropically, their associated alpha particles are not and so less than half of the neutron trajectories may be determined with this configuration.

In embodiments, the particle detector(s) 161 of the neutron imaging device 100 is disposed within the hermetic sealed envelope of the neutron source and therefore can function within a partial vacuum environment of the sealed envelope of the neutron source and also not contribute to the degradation of the partial vacuum environment. In addition, the particle detector(s) 161 can participate in the final processing procedure of the sealed envelope of the neutron source without damage to the particle detector(s) 161, where the final processing procedure entails evacuation under very high temperature, inflow of deuterium and tritium gas, and permanent closure of the hermetic envelope. The particle detector(s) 161 can also be configured to operate effectively in the harsh operational environment within the sealed envelope of the neutron source, which includes high temperature and charged particle, neutron, and x-ray exposures.

These environmental requirements put strict limitations on the type of technology and materials that may constitute the particle detector(s) 161. Organic compounds for insulators and sealing purposes are ruled out due to the high temperature and high vacuum requirements and may be further limited by their poor resistance to radiation damage from x-rays and neutrons.

Figure 6:
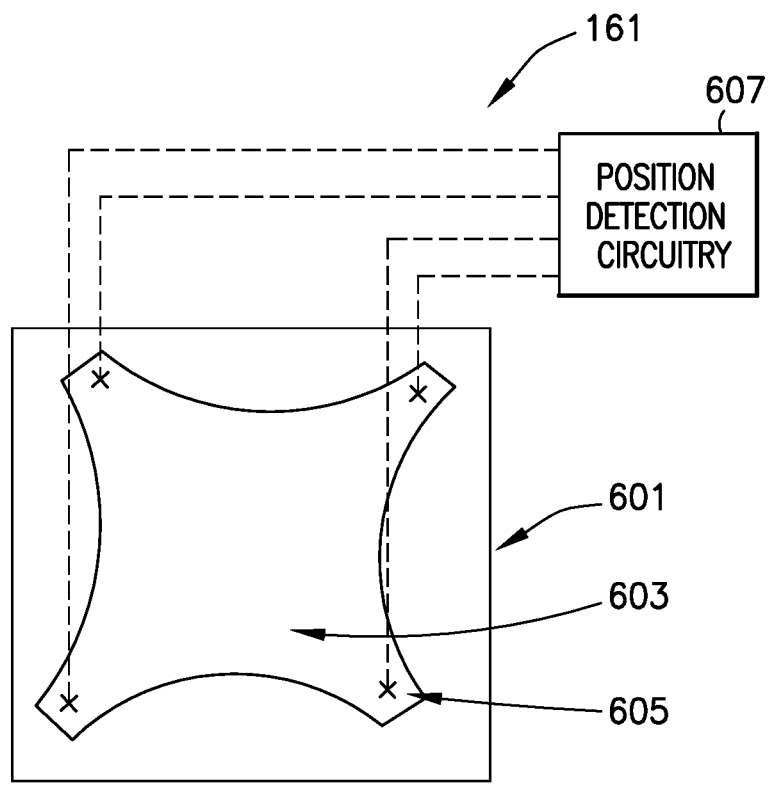
FIG. 6 is a schematic illustration of a resistive anode encoder in accordance with the present disclosure, before being rolled into a cylindrical form.

In embodiments, the particle detector(s) 161 can be realized by a position sensitive particle detector, such as a resistive anode encoder (RAE). An example RAE particle detector is illustrated in FIG. 6, which includes a ceramic insulating substrate 601 with a resistive glaze 603 applied according to the pattern of FIG. 6. When used in the sealed tube neutron source 151, the RAE particle detector is rolled into a cylindrical form. Such rolling can be done while the ceramic insulating substrate 601 is in the green state and prior to final firing. Electrical connections 605 can be made at the four corners as shown so that voltage measurements may be made with the position detection circuitry 607. Any charged particle landing within the glazed area 603 will generate voltages at the four electrode connections 605 such that the relative values of these voltages can be measured by the position detection circuitry 607 to determine the location where the charged particle landed. This location can be used to determine the direction of propagation of the charged particle, and the direction of propagation of the charged particle can be transformed to the opposite direction of propagation of the corresponding neutron.

Note that several aspects of the RAE particle detector make it suitable for this purpose. First, the RAE particle detector comprises only ceramic and resistive glaze which survive under very high temperatures without alteration and which do not degrade the partial vacuum within the sealed tube neutron source. Moreover, the RAE particle detector has a limited number of electrical connection points (such as four connection points), which means that only a limited number of feedthroughs in the hermetic envelope of the sealed tube neutron source are necessary to pass the electrical information from the inside to the outside of the sealed tube neutron source. Furthermore, the materials of the RAE particle detector are not substantially affected by radiation damage from charged particles, neutrons, and x-rays. Finally, RAE particle detector is mechanically sound and can withstand the shock and vibrations in the borehole environment.

In other embodiments, the neutron imaging device 100 as described above can be part of a bottom hole assembly that terminates in a drilling bit for logging-while-drilling operations. In still other embodiments, the neutron imaging device 100 as described above can be deployed in a cased well environment (borehole with casing and cement) to produce an image or map of formation density (i.e., data representing formation density as a function of measured depth and azimuth) of the cased well environment and to display or otherwise output the image or map of formation density of the cased well environment.

In one aspect, any one or any portion or all of the steps or operations of the methods and processes as described above can be performed by a processor. For example, any one or any portion or all of the steps or operations of 210, 212, 214, 216, 220, 222 and 224 as described above with respect to FIG. 2 can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The memory can be used to store any or all data sets of the methods and processes described above.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A neutron imaging device comprising:
a neutron source including a sealed enclosure, wherein the neutron source generates neutrons and associated particles, whereby the neutrons are emitted into a surrounding borehole environment and interact with the borehole environment to produce secondary gamma rays;
at least one gamma ray detector, spaced from the neutron source, that detects the secondary gamma rays;
at least one particle detector disposed in the sealed enclosure of the neutron source, wherein the at least one particle detector detects the associated particles generated by the neutron source; and
at least one processor configured to:
  i) determine propagation directions of the associated particles generated by the neutron source based on an output of the at least one particle detector;
  ii) transform the propagation directions of the associated particles to propagation directions of the neutrons;
  iii) determine locations in the surrounding borehole environment, where the secondary gamma rays are generated based on the propagation directions of the neutrons determined in ii) and an output of the at least one gamma ray detector; and
  iv) determine data representing a formation density at the locations in the surrounding borehole environment determined in iii) based on an output of the at least one gamma ray detector;
wherein the at least one gamma ray detector includes at least one scintillation crystal having shielding disposed proximate opposite ends of the at least one scintillation crystal.

2. The neutron imaging device of claim 1, wherein:
the at least one gamma ray detector includes a single cylindrical scintillation crystal having shielding disposed proximate opposite ends of the single cylindrical scintillation crystal, and
the single cylindrical scintillation crystal detects the secondary gamma rays without differentiating the secondary gamma rays according to azimuth.

3. The neutron imaging device of claim 2, wherein:
azimuthal information for the propagation directions of the neutrons determined in ii) is provided by an output of the at least one particle detector.

4. The neutron imaging device of claim 1, wherein:
the at least one gamma ray detector includes a plurality of elongate scintillation crystal segments having shielding disposed proximate opposite ends of the plurality of elongate scintillation crystal segments, and
the plurality of elongate scintillation crystal segments detect the secondary gamma rays by differentiating the secondary gamma rays according to azimuth.

5. The neutron imaging device of claim 4, wherein:
the plurality of elongate scintillation crystal segments, each having a cross-sectional shape like a piece of a pie.

6. The neutron imaging device of claim 4, wherein:
the at least one gamma ray detector includes a position sensitive photomultiplier device.

7. The neutron imaging device of claim 6, wherein:
the position sensitive photomultiplier device comprises a micro-channel plate detector.

8. The neutron imaging device of claim 4, wherein:
locations in the surrounding borehole environment, where the secondary gamma rays are generated as determined in iii), are based on azimuth differentiation of the at least one gamma ray detector and an output of the at least one particle detector.

9. The neutron imaging device of claim 1, wherein:
the at least one gamma ray detector includes a plurality of scintillation crystals and a plurality of photomultiplier devices disposed linearly along a central axis having shielding disposed proximate opposite ends of each one of the plurality of scintillation crystals.

10. The neutron imaging device of claim 9, wherein:
the plurality of scintillation crystals is selected from the group consisting of: non-segmented scintillation crystals, segmented scintillation crystals, and combinations thereof.

11. The neutron imaging device of claim 1, wherein:
the neutron source further includes a tritium-containing target,
the neutron source generates neutrons and associated particles by bombarding the tritium-containing target with high energy deuterium ions, and
the associated particles are alpha particles.

12. The neutron imaging device of claim 1, wherein:
locations in the surrounding borehole environment where the secondary gamma rays are generated, are determined in iii) based on an evaluation of a coincidence of secondary gamma rays detected by the at least one gamma ray detector and associated particles detected by the at least one particle detector.

13. The neutron imaging device of claim 1, wherein:
locations in the surrounding borehole environment where secondary gamma rays are generated, are determined in iii) based on a time delay between secondary gamma rays detected by the at least one gamma ray detector and associated particles detected by the at least one particle detector.

14. The neutron imaging device of claim 1, wherein:
the at least one processor is further configured to: display or otherwise output data representing a formation density as a function of measured depth and azimuth in the surrounding borehole environment by using the data determined in iv).

15. The neutron imaging device of claim 1, wherein:
the neutron imaging device is configured to be disposed within an open borehole or a cased well, and
the surrounding borehole environment comprises the open borehole in a wireline or while-drilling application, or the cased well when the neutron imaging device is disposed therein.

16. A neutron imaging device comprising:
a neutron source including a sealed enclosure, wherein the neutron source generates neutrons and associated particles, whereby the neutrons are emitted into a surrounding borehole environment and interact with the borehole environment to produce secondary gamma rays;
at least one gamma ray detector, spaced from the neutron source, that detects the secondary gamma rays;
at least one particle detector disposed in the sealed enclosure of the neutron source, wherein the at least one particle detector detects the associated particles generated by the neutron source; and
at least one processor configured to:
i) determine propagation directions of the associated particles generated by the neutron source based on an output of the at least one particle detector;
ii) transform the propagation directions of the associated particles to propagation directions of the neutrons;
iii) determine locations in the surrounding borehole environment, where the secondary gamma rays are generated based on the propagation directions of the neutrons determined in ii) and an output of the at least one gamma ray detector; and
iv) determine data representing a formation density at the locations in the surrounding borehole environment determined in iii) based on an output of the at least one gamma ray detector;
wherein the at least one particle detector comprises a resistive anode encoder having a ceramic substrate and a resistive glaze.

17. The neutron imaging device of claim 16, wherein:
the resistive anode encoder is cylindrical in form.

18. The neutron imaging device of claim 17, wherein:
the resistive anode encoded is rolled into a form of a cylinder prior to final firing of the ceramic substrate.

19. The neutron imaging device of claim 16, wherein:
the neutron source further includes an acceleration section;
the resistive anode encoder is disposed proximate the acceleration section of the neutron source operated at or near ground potential; and
the resistive anode encoder produces low voltage signals in response to a detection of an associated particle generated by the neutron source.

20. The neutron imaging device of claim 19, further comprising:
at least one electrical feedthrough that extends through the sealed enclosure of the neutron source and carries the low voltage signals produced by the resistive anode encoder.

21. The neutron imaging device of claim 16, wherein:
the neutron source further includes a tritium-containing target,
the neutron source generates neutrons and associated particles by bombarding the tritium-containing target with high energy deuterium ions, and
the associated particles are alpha particles.

22. The neutron imaging device of claim 16, wherein:
locations in the surrounding borehole environment, where the secondary gamma rays are generated, are determined in iii) based on an evaluation of a coincidence of secondary gamma rays detected by the at least one gamma ray detector and associated particles detected by the at least one particle detector.

23. The neutron imaging device of claim 16, wherein:
locations in the surrounding borehole environment, where the secondary gamma rays are generated, are determined in iii) based on a time delay between secondary gamma rays detected by the at least one gamma ray detector and associated particles detected by the at least one particle detector.

24. The neutron imaging device of claim 16, wherein:
the at least one processor is further configured to:
display or otherwise output data representing a formation density as a function of measured depth and azimuth in the surrounding borehole environment by using the data determined in iv).

25. The neutron imaging device of claim 16, wherein:
the neutron imaging device is configured to be disposed within an open borehole or a cased well, and
the surrounding borehole environment comprises the open borehole in a wireline or while-drilling application, or the cased well when the neutron imaging device is disposed therein.

* * * * *